T. RO SATOW.
VEGETABLE PEELER.
APPLICATION FILED FEB. 8, 1915.
1,150,629.
Patented Aug. 17, 1915.
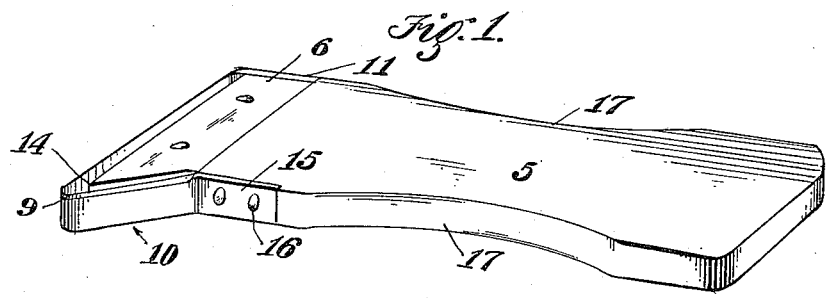
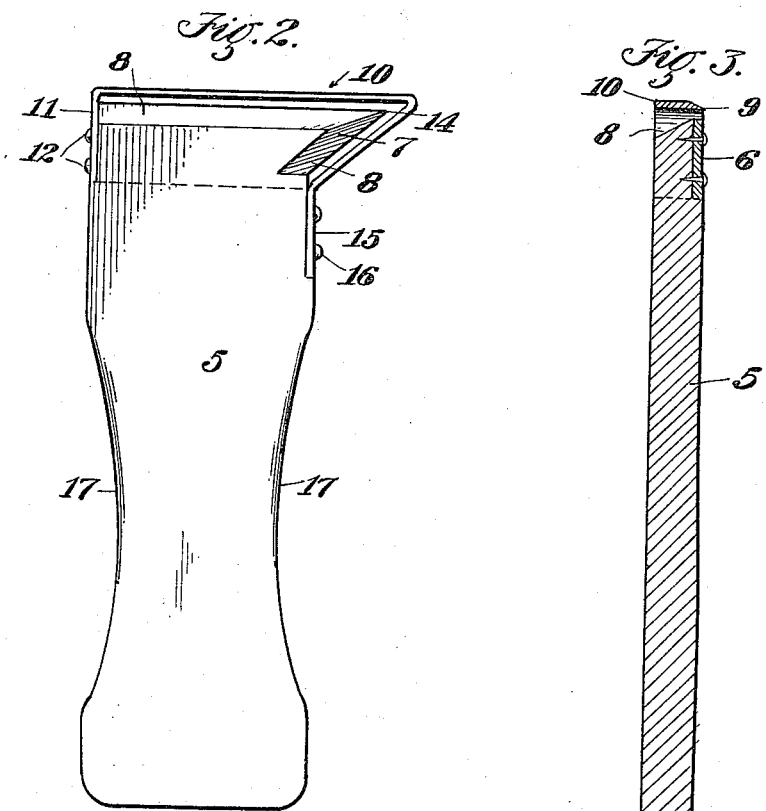 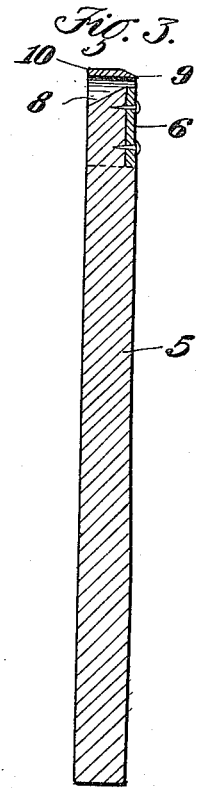
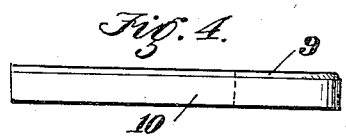
Witnesses:
James M. Abbett
Marguerite Bates
Inventor
Takusaburo Satow.
By
Edmund P. Thomas,
Atty.

UNITED STATES PATENT OFFICE.

TOKUSABU RO SATOW, OF LOS ANGELES, CALIFORNIA.

VEGETABLE-PEELER.

1,150,629. Specification of Letters Patent. Patented Aug. 17, 1915.

Application filed February 8, 1915. Serial No. 6,831.

*To all whom it may concern:*

Be it known that I, TOKUSABU RO SATOW, a subject of the Emperor of Japan, residing at Los Angeles, in the county of Los Angeles and State of California, have invented new and useful Improvements in Vegetable-Peelers, of which the following is a specification.

This invention relates to a vegetable peeler, and more particularly to peelers of the manually operated type, and the principal object is to provide a skin peeler that is readily adapted to peeling, as well as removing the eyes or other undesirable portions of a potato.

It is also an object to provide a vegetable peeler of simple form and cheaply constructed.

In the drawings accompanying this specification: Figure 1 is a perspective view of the operating face of the instrument. Fig. 2 is an elevation showing the oppositely disposed face as that shown in Fig. 1. Fig. 3 is a longitudinal cross section of the device. Fig. 4 is an end view of the blade end.

More specifically in the drawing, 5 designates a handle portion, being preferably rectangular in configuration and formed of wood, and has secured at the front face on the outer end thereof a metallic plate 6 which extends across the entire front of the outer end of the handle which is provided with a projecting angular portion 7, the wood being cut-away on a bevel, as clearly indicated by numeral 8, so that the peels cut from the fruit or vegetable by the sharp edge 9 of the blade 10, will be readily freed from contact with the inner portion of the blade without obstructing the further operation.

The main portion of the blade is elongated and rectangular, and has a straight edge, one end being bent down, as shown at 11 to be secured by nails 12 to the straight side of the handle 5. The straight edge being parallel with the adjacent end of the handle portion a slight distance beyond the point 14 and around parallel with the projecting angular portion 7; this end being bent to form the ear 15 secured to the handle by the nails 16.

Transverse grooves are preferably formed in the handle portion to receive the ears 11 and 15, the wood being cut-away at points 17 to form a more convenient grasp.

Metallic plate 6 is designed to provide a smooth wearing surface.

The operation will be readily understood. Grasped by the handle 5 the edge 9 is drawn over the surface of the vegetable to be pared. When it is desired to remove eyes or other portions, the loop formed opposite the points 14 in the blade is used with a twisting action of the handle.

Having thus described my invention, what I claim is:

A vegetable peeler, comprising a substantially flat handle having a squared outer end and being also provided on one corner thereof with a pointed projecting portion, one edge of the outer end including the pointed projecting portion being beveled, a cutting blade secured to said handle on the outer end thereof, said blade being disposed a slight distance from the end surface of said handle to form a slot through which the peelings are directed on a vegetable peeling operation, and a metallic wear plate secured to the outer end face of the handle adjacent the cutting knife.

In witness that I claim the foregoing I have hereunto subscribed my name this 23rd day of January, 1915.

TOKUSABU RO SATOW.

Witnesses:
EDMUND A. STRAUSE,
KENNETH S. SNZUKE.

Copies of this patent may be obtained for five cents each, by addressing the "Commissioner of Patents, Washington, D. C."